(12) United States Patent  (10) Patent No.: US 12,541,855 B2
Yang et al.  (45) Date of Patent: Feb. 3, 2026

(54) METHOD, DEVICE AND SYSTEM FOR INTERACTIVE CONTOURING OF MEDICAL IMAGE, AND STORAGE MEDIUM

(71) Applicant: OUR UNITED CORPORATION, Xi'an (CN)

(72) Inventors: Weiqun Yang, Xi'an (CN); Hao Yan, Xi'an (CN); Jiuliang Li, Xi'an (CN); Wen Wang, Xi'an (CN); Ningwei He, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 724 days.

(21) Appl. No.: 17/932,043

(22) Filed: Sep. 14, 2022

(65) Prior Publication Data

US 2023/0081515 A1  Mar. 16, 2023

(30) Foreign Application Priority Data

Sep. 14, 2021  (CN) .......................... 202111072087.X (51) Int. Cl.
*G06T 7/12* (2017.01)
*G06T 7/00* (2017.01)
*G16H 10/60* (2018.01)

(52) U.S. Cl.
CPC .............. *G06T 7/12* (2017.01); *G06T 7/0012* (2013.01); *G16H 10/60* (2018.01); *G06T 2207/30004* (2013.01)

(58) Field of Classification Search
CPC ..................... G06T 7/12; G06T 7/0012; G06T 2207/30004; G16H 10/60; G16H 30/40; G16H 50/20; G16H 40/67
USPC ........................................................ 382/128
See application file for complete search history.

(56) References Cited

U.S. PATENT DOCUMENTS

| | | | |
|---|---|---|---|
| 11,086,845 B1 * | 8/2021 | Shah ...................... | G06F 16/219 |
| 2006/0265252 A1 * | 11/2006 | Nishii ..................... | G16H 30/20 |
| | | | 707/999.001 |
| 2020/0364857 A1 * | 11/2020 | Moen ..................... | G06T 11/001 |
| 2021/0016109 A1 * | 1/2021 | Sjölund ................ | A61N 5/1031 |
| 2021/0182252 A1 * | 6/2021 | Arlt ....................... | G06F 21/6227 |
| 2022/0140840 A1 * | 5/2022 | Wang .................. | H03M 7/3064 |
| | | | 707/693 |
| 2022/0148711 A1 * | 5/2022 | Kuo ....................... | G06T 7/0012 |
| 2022/0198674 A1 * | 6/2022 | Choi ........................ | G06T 7/12 |
| 2023/0070457 A1 * | 3/2023 | Kobayashi ............. | A61B 34/30 |
| 2023/0100255 A1 * | 3/2023 | Gooding .................. | G06T 7/10 |
| | | | 382/128 |

\* cited by examiner

*Primary Examiner* — Juan A Torres
(74) *Attorney, Agent, or Firm* — Kolitch Romano Dascenzo Gates LLP (57) ABSTRACT

Disclosed is a method for interactive contouring of a medical image, The method includes: running a contour service process to receive patient information to be contoured, perform contouring based on the patient information to be contoured, and save a contouring result; and running an access service process to acquire, in response to an access request for a contouring result of a first target patient, the contouring result of the first target patient from the saved contouring result, and send the acquired contouring result to a user terminal.

18 Claims, 4 Drawing Sheets

METHOD, DEVICE AND SYSTEM FOR INTERACTIVE CONTOURING OF MEDICAL IMAGE, AND STORAGE MEDIUM

CROSS-REFERENCE TO RELATED APPLICATION

This application is based on and claims priority to Chinese Patent Application No. 202111072087.X, filed on Sep. 14, 2021, the disclosure of which is herein incorporated by reference in its entirety.

TECHNICAL FIELD

The present disclosure relates to a method, device and system for interactive contouring of a medical image, and a storage medium.

BACKGROUND

With the development of cloud computing and artificial intelligence technologies, a deep learning network model has also been applied in the field of medical radiotherapy. Using the deep learning network model to process a medical image, identify an organ at risk (OAR) in the image and generating a file with a medical image contour can help a doctor fulfill the task of delineating the OAR prior to radiotherapy planning, which improves the work efficiency.

SUMMARY

Embodiments of the present disclosure relate to a method, device and system for interactive contouring of a medical image, and a storage medium.

In one aspect, the embodiments of the present disclosure provide a method for interactive contouring of a medical image. The method includes: running a contour service process to receive patient information to be contoured, perform contouring based on the patient information to be contoured, and save a contouring result; and running an access service process to acquire, in response to an access request for a contouring result of a first target patient, the contouring result of the first target patient from the saved contouring result, and send the acquired contouring result of the first target patient to a user terminal.

In some embodiments, the method further includes: running the contour service process to update a contouring list in a predetermined database based on a contouring progress, the contouring list including a patient information list corresponding to a medical image to be contoured, a patient information list corresponding to a medical image being contoured, and a patient information list corresponding to a contoured medical image; and running the access service process to query, in response to a query request for a contouring progress of a second target patient, the contouring list in the predetermined database to determine the contouring progress of the second target patient, and send the contouring progress corresponding to the second target patient to the user terminal.

In some embodiments, the predetermined database includes a first database and a second database, wherein the first database is configured to store the patient information list corresponding to the medical image to be contoured, and the patient information list corresponding to the medical image being contoured; and the second database is configured to store the patient information list corresponding to the contoured medical image.

In some embodiments, the first database is a Redis database and/or the second database is a MySQL database.

In some embodiments, the contour service process includes a first contour service thread and a second contour service thread, wherein the first contour service thread is configured to sequentially receive patient information to be contoured, and sequentially save the patient information to be contoured in the patient information list corresponding to the medical image to be contoured; the second contour service thread is configured to sequentially read the patient information to be contoured from the patient information list corresponding to the medical image to be contoured, write the read patient information into the patient information list corresponding to the medical image being contoured, and delete the read patient information from the patient information list corresponding to the medical image to be contoured; and the second contour service thread is further configured to sequentially contour a medical image corresponding to patient information in the patient information list corresponding to the medical image being contoured, write the contoured patient information into the patient information list corresponding to the contoured medical image upon finishing contouring, and delete the contoured patient information from the patient information list corresponding to the medical image being contoured.

In some embodiments, the method further includes: running the access service process to lock, in response to a contouring order adjustment request, patient information to be contoured, and unlock, upon completion of contouring order adjustment, the patient information to be contoured; and running the contour service process to acquire a state of the patient information to be contoured, terminate contouring until the patient information to be contoured is unlocked in the case that the patient information to be contoured is in a locked state, and perform contouring based on the patient information to be contoured.

In some embodiments, the method further includes: running the access service process to read, in response to a contouring order adjustment request from a browsing page of the user terminal, patient information in a patient information list corresponding to a medical image to be contoured, adjust, based on the contouring order adjustment request, an ordering of the patient information in the patient information list corresponding to the medical image to be contoured in the case that it is determined that the ordering of the patient information in the list is the same as an ordering of patient information displayed on the browsing page, or otherwise, refresh the patient information displayed on the browsing page.

In some embodiments, the method further includes: creating the contour service process and the access service process, and establishing a predetermined database; and setting a communication protocol, and calling, when receiving an operation request, the contour service process and/or the access service process based on the communication protocol to access the predetermined database.

In some embodiments, the method further includes: running the contour service process to receive patient information to be contoured, inputting a medical image corresponding to the patient information into a predetermined image generation model, contouring the medical image by the predetermined image generation model to acquire a medical image contour, and save the medical image contour.

In another aspect, the embodiments of the present disclosure further provide a device for interactive contouring of a medical image. The device includes:

a contouring module, configured to run a contour service process so as to receive patient information to be contoured, perform contouring based on the patient information to be contoured, and save a contouring result; and art accessing module, configured to run an access service process so as to acquire, in response to an access request for a contouring result of a first target patient, the contouring result of the first target patient, from the saved contouring result, and send the acquired contouring result of the first target patient to a user terminal.

In some embodiments, the device further includes a predetermined database. The predetermined database is configured to save the contouring result and a contouring list. The contouring list includes a patient information list corresponding to a medical image to be contoured, a patient information list corresponding to a medical image being contoured, and a patient information list corresponding to a contoured medical image.

In some embodiments, the predetermined database includes a first database and a second database, wherein the first database is configured to store the patient information list corresponding to the medical image to be contoured, and the patient information list corresponding to the medical image being contoured; and the second database is configured to store the patient information list corresponding to the contoured medical image.

In some embodiments, the first database is a Redis database and/or the second database is a MySQL database.

In some embodiments, the device further includes:

a static resource service module, configured to receive the access request for the contouring result of the first target patient, acquire address information of the first target patient relevant to the access request, acquire the contouring result of the first target patient saved in the address information, and send the acquired contouring result to the accessing module.

In yet another aspect, the embodiments of the present disclosure further provide a device for interactive contouring of a medical image. The device includes:

one or more processors;

a memory; and one or more applications stored in the memory, wherein the processor, when running the one or more applications, implements any one of the methods for interactive contouring of a medical image as described above.

In still another aspect, the embodiments of the present disclosure further provide a system for interactive contouring of a medical image. The system includes any one of the devices for interactive contouring of a medical image as described above and a user terminal.

In yet still another aspect, the embodiments of the present disclosure further provide a non-transitory computer-readable storage medium storing one or more computer programs, wherein the one or more computer programs, when loaded and run by a processor of a device, cause the device to perform any one of the methods for interactive contouring of a medical image as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Technical solutions in the embodiments of the present disclosure are described clearly and completely below in combination with the accompanying drawings in the embodiments of the present disclosure. Apparently, the described embodiments are only a part of embodiments of the present disclosure, not all embodiments of the present disclosure. All other embodiments achieved by persons skilled in the art based on the embodiments of the present disclosure without creative work shall fall within the scope of the present disclosure.

In the description of the present disclosure, it is to be understood that orientation or position relationships indicated by terms "center," "longitudinal," "transversal," "length," "width," "thickness," "upper," "lower," "front," "rear," "left," "right," "vertical," "horizontal," "top," "bottom," "inner," and "outer" are orientation or position relationships shown based on the accompanying drawings. These terms are only for ease of the description of the present disclosure and simplification of the description rather than indicating or implying that an indicated apparatus or element should have a particular orientation or be constructed and operated in the particular orientation, and thus should not be understood as limiting to the present disclosure. In addition, terms "first" and "second" are only for the purpose of description and should not be understood as indicating or implying relative importance or implicitly indicating the number of indicated technical features. Thus, features defined by the terms "first" and "second" may explicitly or implicitly include one or more of the features.

In the description of the present disclosure, the term "a plurality of" means two or more, unless otherwise specifically limited.

In the present disclosure, the word "exemplary" is configured to indicate "serving as an example, illustration or description". Any embodiment described as "exemplary" in the present disclosure is not necessarily to be construed as more preferred or more advantageous than other embodiments. The following description is provided to enable any person skilled in the art to realize and apply the present disclosure. In the following description, details are set forth for the purpose of explanation. It should be understood that persons of ordinary skills in the art may recognize that the present disclosure may also be realized without these specific details. In other embodiments, well-known structures and processes are not described in detail to prevent unnecessary details from obscuring the description of the present disclosure. Therefore, the present disclosure is not intended to be limited to the illustrated embodiments, but is consistent with the widest scope in line with the principles and features disclosed herein.

In the related art, in order to allow a doctor to view a contouring situation and a contouring result on various terminals such as computers, tablet computers, and mobile phones at anytime and anywhere, various types of related medical software are developed. The software is generally implemented based on a browser-server (BS) architecture. However, when several doctors simultaneously access a server through a browser to view the contouring situation or the contouring result, the server is not only required to process an http request transmitted by the browser and send contouring progress information to the browser of the terminal, but also required to finish a contouring task of a medical image. In this case, the server may have difficulty in responding to the contouring task and the request transmitted by the browser of the terminal timely and simultaneously due to the high pressure on the server. That is, a medical image contour service and a medical image contour query service may interfere with each other, resulting in high pressure on device hardware.

Embodiments of the present disclosure provide a method, device and system for interactive contouring of a medical image, and a storage medium, which are described below in detail, respectively.

Figure 1:
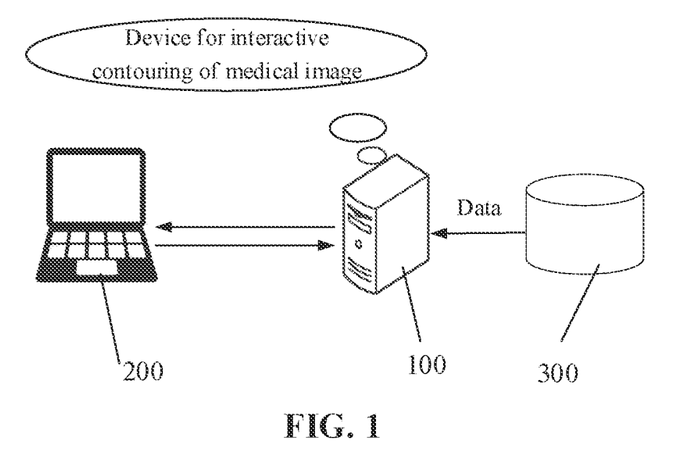
FIG. 1 is a schematic diagram of a scenario of a system for interactive contouring of a medical image according to an embodiment of the present disclosure.

Referring to FIG. 1, which is a schematic diagram of a scenario of a system for interactive contouring of a medical image according to an embodiment of the present disclosure. The system according to an embodiment of the present disclosure may include a device 100 for interactive contouring of a medical image and a user terminal 200 that are in communication connection with each other for data transmission and interaction.

The device 100 according to an embodiment of the present disclosure is mainly configured to: run a contour service process, the contour service process being configured to receive patient information to be contoured, perform contouring based on the patient information to be contoured, and save a contouring result; and run an access service process, the access service process being configured to acquire, in response to an access request for a contouring result of a first target patient initiated by the user terminal 200, the contouring result of the first target patient from the saved contouring result, and send the acquired contouring result to the user terminal 200.

In addition, as shown in FIG. 1, the system may further include a background database 300 configured to store data, such as storing a contouring result.

The device 100 may access the background database 300 (the background database may be in a local memory of the device, or set in a cloud), and the background database 300 stores information related to interaction of medical image contouring.

In an embodiment of the present disclosure, the device 100 may be an independent server, or a server network or server cluster composed of servers. The device 100 described herein includes, but is not limited to, a computer, a network host, a single network server, and a cloud server composed of a plurality of network server clusters or a plurality of servers. The cloud server is formed by a large number of computers or network servers based on cloud computing.

In an embodiment of the present disclosure, the above user terminal 200 may be a general-purpose computer device or a special-purpose computer device. In some specific embodiments, the user terminal 200 may be a desktop computer, a portable computer, a network server, a personal digital assistant (PDA), a mobile phone, a tablet computer, a wireless terminal device, a communication device, or an embedded device, or the like. The type of the user terminal 200 is not limited in this embodiment.

In an embodiment of the present disclosure, the device 100 and the user terminal 200 may realize communication in any communication fashion, which includes but is not limited to, mobile communication based on a 3rd generation partnership project (3GPP), a 4th generation mobile communication technology (4G), a 5th generation mobile communication technology (5G), long term evolution (LTE) and worldwide interoperability for microwave access (WiMAX), or computer network communication based on a TCP/IP protocol suite and a user datagram protocol (UDP), or interaction such as acquisition, filing, communication, display and query of medical digital images based on a digital imaging and communications in medicine (DICOM) standard.

Persons skilled in the art may understand that the scenario shown in FIG. 1 is only an exemplary application scenario in the solution of the present disclosure, which does not constitute a limitation to the application scenario in the solution of the present disclosure. Other application scenarios may further include more or less computer devices than that shown in FIG. 1. For example, FIG. 1 only shows one computer device, whereas in other application scenarios, the system may further include one or more other computer devices that may process data, which is not limited in detail herein.

It is to be noted that the schematic diagram of the scenario of the system shown in FIG. 1 is only an example, and the scenario thereof described in an embodiment of the present disclosure is only for describing the technical solutions according to the embodiments of the present disclosure more clearly rather than limiting the technical solutions according to the embodiments of the present disclosure. It is known to persons of ordinary skills in the art that, with the evolution of the medical image contouring technology and the emergence of a new business scenario, the technical solutions according to the embodiments of the present disclosure are also applicable to similar technical problems.

Figure 2:
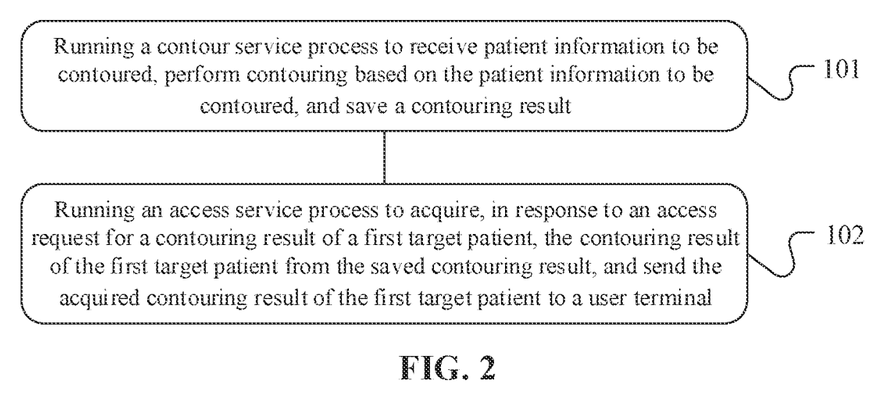
FIG. 2 is a schematic flowchart of a method for interactive contouring of a medical image according to an embodiment of the present disclosure.

Based on the above scenario of the system for interactive contouring of a medical image, embodiments of the present disclosure provide a method for interactive contouring of a medical image. FIG. 2 is a schematic flowchart of a method for interactive contouring of a medical image according to an embodiment of the present disclosure. The method is applicable to the device 100 in the system for interactive contouring of a medical image. As shown in FIG. 2, the method may include steps 101 to 102.

In 101, a contour service process is run to receive patient information to be contoured, perform contouring based on the patient information to be contoured, and save a contouring result.

In the method for interactive contouring of a medical image according to this embodiment, prior to running the contour service process and the access service process, the contour service process, the access service process, and a predetermined database may be pre-created, and a communication protocol may be set. Specifically, referring to FIG. 3, which is a schematic diagram of an interactive environment of a method for interactive contouring of a medical image according to an embodiment of the present disclosure.

Figure 3:
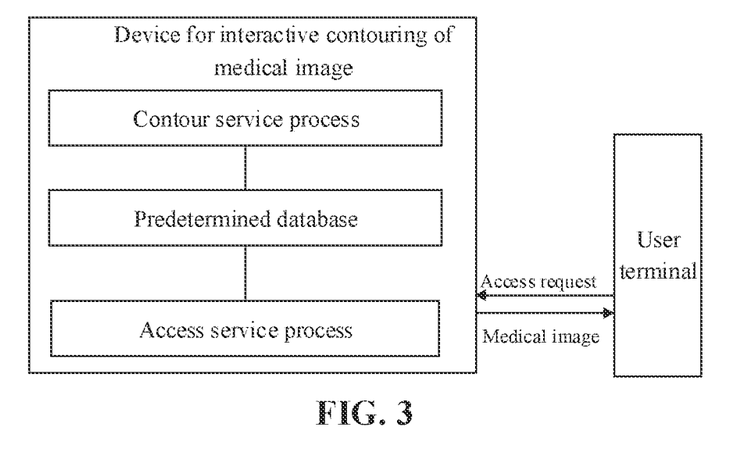
FIG. 3 is a schematic diagram of an interactive environment of a method for interactive contouring of a medical image according to an embodiment of the present disclosure.

In this embodiment, upon creating the contour service process, the access service process, the predetermined database, and the communication protocol, the device performs interaction of medical image contouring based on the contour service process, the access service process, the predetermined database, and the communication protocol.

That is, the device runs the contour service process, the contour service process being configured to receive the patient information to be contoured. The patient information in this embodiment includes patient identification information. The patient identification information refers to unique identification information for identifying a patient, such as a name of the patient, a medical and social security number of the patient, or other unique identification information that may identify an identity of the patient, and the patient information corresponds to a medical image to be contoured of the patient. The device may run the contour service process to perform contouring on the medical image to be contoured corresponding to the patient information to be contoured and save a contouring result for later access and query. The patient information to be contoured refers to the patient information corresponding to the medical image to be contoured.

In 102, an access service process is run to acquire, in response to an access request for a contouring result of a first target patient, the contouring result of the first target patient from the saved contouring result, and send the acquired contouring result of the first target patient to the user terminal.

The device may receive the access request for the contouring result, wherein the triggering fashion of the access request is not limited in detail. In some embodiments, the access request may be initiatively triggered by a user. For example, the user triggers the access request by inputting/querying patient identification information with an identity (ID) being xxx on the user terminal, and the user terminal sends the access request to the device. In some other embodiments, the access request may also be automatically triggered. For example, the device is preset to automatically trigger the access request when the user logs in. The device detects a login state of the user in real time, and automatically triggers the access request when detecting that the user logs in.

Upon receiving the access request, the device may run the access service process, the access service process being configured to acquire, in response to the access request for the contouring result of the first target patient, the contouring result of the first target patient from the saved contouring result, and send the acquired contouring result to the user terminal.

In the embodiment of the present disclosure, the contour service process and the access service process are set and configured to process a contouring request and an access and query request, and the two processes share data and work cooperatively, such that the interference between tasks corresponding to different services may be avoided, two functions for processing the contouring request and processing the access and query request do not affect each other and are decoupled from each other, thereby reducing the pressure on the hardware.

Figure 4:
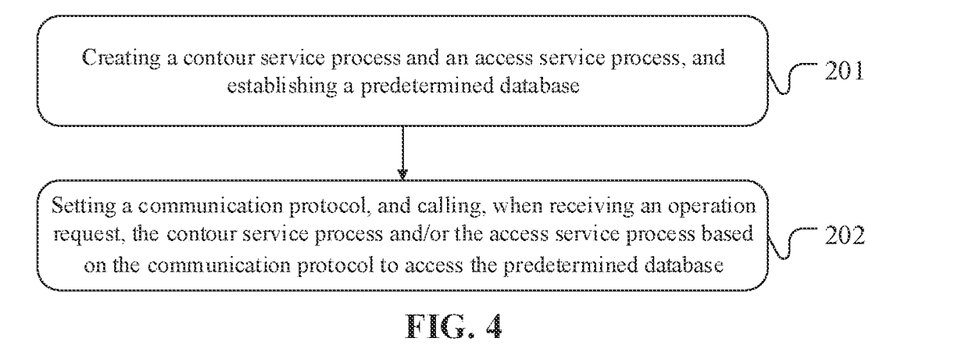
FIG. 4 is a schematic flowchart of creating an interactive environment for a method for interactive contouring of a medical image according to an embodiment of the present disclosure.

Prior to performing the steps in the method for interactive contouring of a medical image according to this embodiment, an interactive environment may be firstly created. Reference is made to FIG. 3 and FIG. 4. FIG. 3 is a schematic diagram of an interactive environment of a method for interactive contouring of a medical image according to an embodiment of the present disclosure, and FIG. 4 is a schematic flowchart of creating an interactive environment of a method for interactive contouring of a medical image according to an embodiment of the present disclosure.

In this embodiment, it is required to create the interactive environment in the method for interactive contouring of a medical image. Specifically, referring to FIG. 4, the method according to this embodiment includes steps 201 to 202.

In 201, a contour service process and an access service process are created, and a predetermined database is established.

In 202, a communication protocol is set, and the contour service process and/or the access service process is called upon receiving the access request based on the communication protocol to access the predetermined database.

In this embodiment, the device may create the contour service process and the access service process by calling a system language function, wherein the contour service process is configured to receive patient information to be contoured, perform contouring on a medical image to be contoured based on the patient information to be contoured and save a contouring result; and the access service process is configured to acquire, in response to an access request for a contouring result of a first target patient, the contouring result of the first target patient from the saved contouring result, and send the acquired contouring result to the user terminal.

The device may also establish the predetermined database, wherein the predetermined database refers to a database that is pre-established and configured to store contouring information related to the interaction of medical image contouring. The type of the predetermined database and the type of a data table stored in the database are not limited. In some embodiments, the predetermined database may store at least one of the patient information to be contoured, the medical image to be contoured corresponding to the patient information to be contoured and the contouring result acquired upon contouring.

The device may also set the communication protocol, call the contour service process and/or the access service process based on the communication protocol, and access the predetermined database to perform the interaction of medical image contouring.

Figure 5:
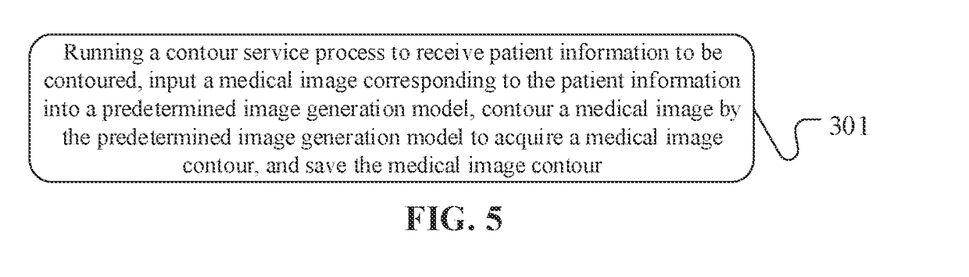
FIG. 5 is a schematic flowchart of contouring of a medical image in a method for interactive contouring of a medical image according to an embodiment of the present disclosure.

FIG. 5 is a schematic flowchart of contouring of a medical image in a method for interactive contouring of a medical image according to an embodiment of the present disclosure.

In the method for interactive contouring of a medical image according to this embodiment, performing contouring on the medical image includes the following step. In 301, the contour service process is run to receive the patient information to be contoured, input the medical image corresponding to the patient information into a predetermined image generation model, contour a medical image by the predetermined image generation model to acquire a medical image contour, and save the medical image contour.

In some embodiments of the present disclosure, the device may contour the medical image by calling the predetermined image generation model. The predetermined image generation model herein refers to a pre-developed medical contouring algorithm, for example, a deep learning algorithm. The method and device for interactive contouring of a medical image may run the contour service process. The contour service process may receive the patient information to be contoured, input the medical image corresponding to the patient information into the predetermined image generation model, contour the medical image by the predetermined image generation model to acquire a medical image contour, and save the medical image contour. In this embodiment, the medical image contour is generated by the predetermined image generation model, thereby improving the generation efficiency and accuracy of the medical image contour.

Figure 6:
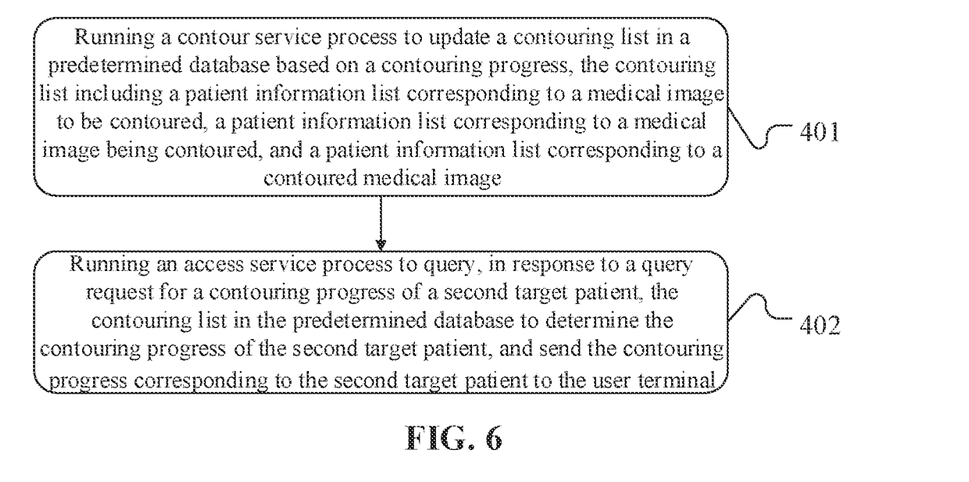
FIG. 6 is a schematic flowchart of querying a contouring progress in a method for interactive contouring of a medical image according to an embodiment of the present disclosure.

FIG. 6 is a schematic flowchart of querying a contouring progress of a medical image corresponding to a target patient in a method for interactive contouring of a medical image according to an embodiment of the present disclosure.

In some embodiments of the present disclosure, the method may include the following steps.

In 401, the contour service process is run to update a contouring list in a predetermined database based on a contouring progress, the contouring list including a patient information list corresponding to a medical image to be contoured, a patient information list corresponding to a medical image being contoured and a patient information list corresponding to a contoured medical image.

That is, the contouring list is pre-stored in the predetermined database of the device for interactive contouring of a medical image to adjust the information in the patient information list corresponding to the medical image to be contoured, the patient information list corresponding to the medical image being contoured and the patient information list corresponding to the contoured medical image based on the contouring progress respectively, thereby ensuring the accuracy and real-time performance of the patient information in each contouring list.

In 402, the access service process is run to query, in response to a query request for a contouring progress of a second target patient, the contouring list in the predetermined database to determine the contouring progress of the second target patient, and send the contouring progress corresponding to the second target patient to the user terminal.

When the device performs contouring by running the contour service process, the user may trigger a contouring progress query request through the user terminal, and the user terminal may send the contouring progress query request to the device. In response to the contouring progress query request, the device may run the access service process to query the contouring list in the predetermined database (in some embodiments, the patient information list corresponding to the medical image being contoured may be queried), determine the contouring progress of the medical image of the target patient, and output the contouring progress in real time, such that the user may view the contouring progress of the target patient in real time.

In this embodiment, when the device runs the access service process, the contour service process run in the device may not be affected in spite of receiving many access requests or query requests, and contouring may still be performed in real time in the contour service process. Based on this, the device may run the contour service process to update the list based on the contouring situation. Specifically, the device updates the patient information corresponding to the medical image to be contoured, the patient information corresponding to the medical image being contoured and the patient information corresponding to the contoured medical image to each list. The device saves the patient information of each contouring progress in each contouring list, such that the user may view the contouring progress and the contouring result.

In some embodiments of the present disclosure, the predetermined database includes a first database and a second database. The first database is configured to store the patient information list corresponding to the medical image to be contoured and the patient information list corresponding to medical image being contoured. The second database is configured to store the patient information list corresponding to the contoured medical image.

The first database may be a Redis database and/or the second database may be a MySQL database.

In this embodiment, the patient information corresponding to the medical image to be contoured and the patient information corresponding to the medical image being contoured are stored in the Redis database. The Redis database supports fast reading, thereby improving the contouring efficiency. The patient information list corresponding to the contoured medical image is stored in the MySQL database, such that the contoured patient information may be stored for a long time, and the user may acquire the contouring result by querying the MySQL database.

In some embodiments of the present disclosure, the contour service process includes a first contour service thread and a second contour service thread. The first contour service thread is configured to sequentially receive the patient information to be contoured, and sequentially save the patient information to be contoured in the patient information list corresponding to the medical image to be contoured.

The second contour service thread is configured to sequentially read the patient information to be contoured from the patient information list corresponding to the medical image to be contoured, write the read patient information into the patient information list corresponding to the medical image being contoured, and delete the read patient information from the patient information list corresponding to the medical image to be contoured; and the second contour service thread is further configured to sequentially contour a medical image corresponding to the patient information in the patient information list corresponding to the medical image being contoured, write the contoured patient information into the patient information list corresponding to the contoured medical image upon finishing contouring, and delete the contoured patient information from the patient information list corresponding to the medical image being contoured. The contoured patient information refers to the patient information corresponding to the contoured medical image.

In this embodiment, the contour service process of the device interactive contouring of a medical image includes a first contour service thread and a second contour service thread. The first contour service thread is configured to receive and save the patient information to be contoured. The second contour service thread is configured to perform a contour operation, and adjust and update the patient information in the predetermined database based on the contour operation. In this way, the contour service is performed in combination with two threads, thereby reducing steps required for the single thread, facilitating task execution, shortening task waiting time, and improving the efficiency of medical image contouring.

Meanwhile, in this embodiment, the patient information list in the predetermined database is updated through the first contour service thread and the second contour service thread in the contour service process, such that the user may know the contouring progress of a medical image in real time.

Figure 7:
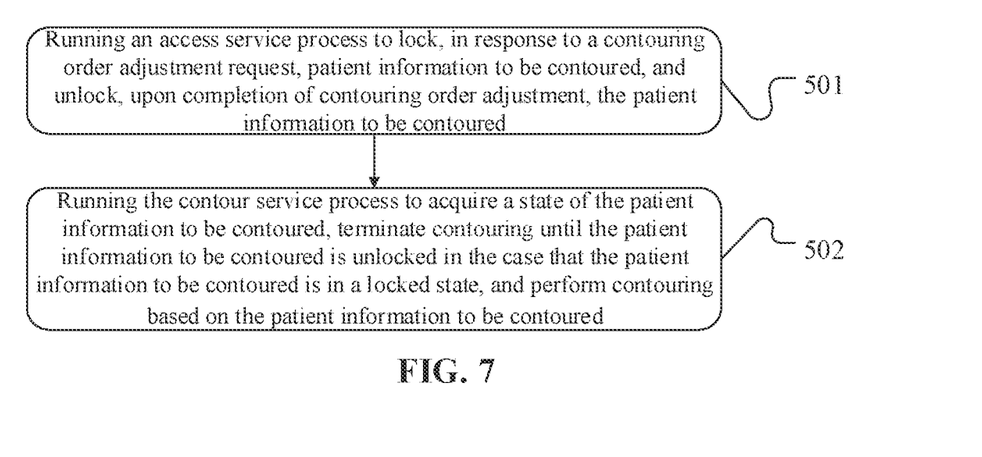
FIG. 7 is a schematic flowchart of adjusting a contouring order in a method for interactive contouring of a medical image according to an embodiment of the present disclosure.

FIG. 7 is a schematic flowchart of adjusting a contouring order in a method for interactive contouring of a medical image according to an embodiment of the present disclosure.

In the method for interactive contouring of a medical image according to an embodiment of the present disclosure, the user is supported to adjust the contouring order on the premise of ensuring correct contouring. This embodiment includes the following steps.

In 501, the access service process is run to lock, in response to a contouring order adjustment request, patient information to be contoured, and unlock, upon finishing the adjustment of the contouring order, the patient information to be contoured.

In 502, the contour service process is run to acquire a state of the patient information to be contoured, terminate contouring until the patient information to be contoured is unlocked in the case that the patient information to be contoured is in a locked state, and perform contouring based on the patient information to be contoured.

In some embodiments of the present disclosure, the access service process is further configured to lock, in response to the contouring order adjustment request, the patient information to be contoured, and unlock, upon finishing the adjustment of the contouring order, the patient information to be contoured; and the contour service process is further configured to acquire the state of the patient information to be contoured, terminate the contour operation until the patient information to be contoured is unlocked in the case that the patient information to be contoured is in the locked state, and perform contouring based on the patient information to be contoured.

In this embodiment, the user may flexibly adjust an ordering of the patient information to be contoured. When the user adjusts the ordering of the patient information to be contoured, the execution of a contouring task in the contour service process may have an error and affect the normal contouring task. The patient information is locked in this embodiment, thereby avoiding the occurrence of the contouring error.

Figure 8:
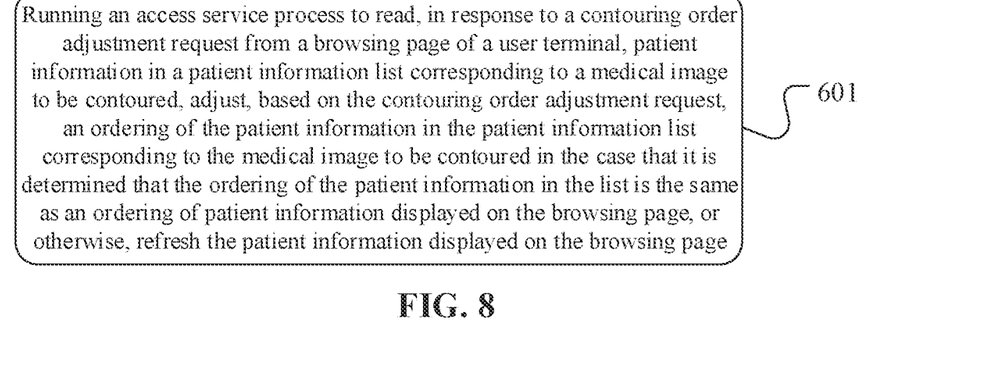
FIG. 8 is a schematic flowchart, of adjusting a contouring order in another method for interactive contouring of a medical image according to an embodiment of the present disclosure.

FIG. 8 is a schematic flowchart of adjusting a contouring order in another method for interactive contouring of a medical image according to an embodiment of the present disclosure.

In the method for interactive contouring of a medical image according to an embodiment of the present disclosure, page information may also be updated timely upon adjusting the contouring order. This embodiment includes the following steps.

In 601, the access service process is run to read, in response to a contouring order adjustment request from a browsing page of the user terminal, patient information in a patient information list corresponding to a medical image to be contoured, adjust, based on the contouring order adjustment request, an ordering of the patient information in the patient information list corresponding to the medical image to be contoured in the case that it is determined that the ordering of the patient information in the list is the same as an ordering of patient information displayed on the browsing page, or otherwise, refresh the patient information displayed on the browsing page.

In some embodiments of the present disclosure, the contour service process in the device receives the contouring order adjustment request, reads the patient information in the patient information list corresponding to the medical image to be contoured based on the contouring order adjustment request, and then compares the ordering of the patient information in the patient information list corresponding to the medical image to be contoured with the ordering of the patient information displayed on the browsing page. In the case that the ordering of the patient information in the patient information list corresponding to the medical image to be contoured is the same as the ordering of the patient information displayed on the browsing page, the ordering of the patient information in the patient information list corresponding to the medical image to be contoured is adjusted based on the contouring order adjustment request; in the case that the ordering of the patient information in the patient information list corresponding to the medical image to be contoured is different from the ordering of the patient information displayed on the browsing page, the patient information displayed on the browsing page is refreshed. In this embodiment, the user is supported by the contour service process to adjust the contouring order and synchronize the data in the database with the displayed data, such that the user may know the contouring progress timely.

Specifically, this embodiment provides a description of a specific application scenario in which a device for interactive contouring of a medical image adjusts the order of the patient information to adjust the contouring order below in detail.

When the user clicks an arrow ↑ or θ, or a top button in a patient information list column, a web service may correspondingly adjust the patient information list in the Redis database. However, in the case that the web service fails to adjust the contouring order timely after the user clicks a particular button on the browser, whereas the contour service already reads the data in the contouring list and deletes the read patient information, the web service may adjust the contouring order erroneously.

The access service process is further configured to read, in response to the contouring order adjustment request from the browsing page of the user terminal, the patient information in the patient information list corresponding to the medical image to be contoured, and adjust the ordering of the patient information in the patient information list corresponding to the medical image to be contoured based on the contouring order adjustment request in the case that it is determined that the ordering of the patient information in the list is the same as an ordering of the patient information displayed on the browsing page, or otherwise, refresh the patient information displayed on the browsing page.

The web service firstly reads the patient information in the patient information list in each adjustment of the contouring order. In the case that the patient information in the list is the same as the patient information displayed on the browser page, the contour service does not modify the content of the patient information list within a time period from clicking an adjustment button by the user to starting the adjustment of the order of the patient information to be contoured by the web service upon receiving the corresponding request, and the order may be modified normally; otherwise, the content displayed on the page is refreshed. Meanwhile, upon determining whether the patient information in the patient information list is consistent with the content on the browser page, it is also required to prevent the contour service from modifying the patient information list based on a mutex principle during determination.

Specifically, the contour service and the web service both attempt to write a variable "lock" in the Redis prior to each modification of the patient information list in the Redis. In the case that the variable "lock" already exists, another process is modifying the Redis, and the state of the variable "lock" is checked all the time until the variable "lock" is deleted. At this time, the variable "lock" is written to start the modification of the patient information list (the web service performs modification after comparison), and then deleted upon finishing the modification. In this way, the contour service is prevented from modifying the content in the Redis when the web service determines whether the patient information list is consistent with the content on the browser page, thereby ensuring the data accuracy.

In some embodiments of the present disclosure, the method for interactive contouring of a medical image is applicable to an Nginx server for communication connection and a distributed device for interactive contouring of a medical image.

In this embodiment, the Nginx server is configured to receive an access request for a contouring result of a first target patient, and distribute the access request to each device for interactive contouring of a medical image in a balanced fashion based on the load degree of each device for interactive contouring of a medical image in the distributed structure, so as to run the access service process in response to the access request by the device for interactive contouring of a medical image.

In the case that the request type of the access request is contour query, the device acquires patient identification information associated with the access request and address information associated with the patient identification information; the device sends a contour query request to a preset load balancing service based on the address information to request for a target medical image contour corresponding to the patient identification information from the preset load balancing service; and the device receives the target medical image contour from the preset load balancing service, and outputs the target medical image contour. In this embodiment, the access request may be distributed in a more balanced fashion based on the load degree of each apparatus to reduce the hardware pressure of the device.

Figure 9:
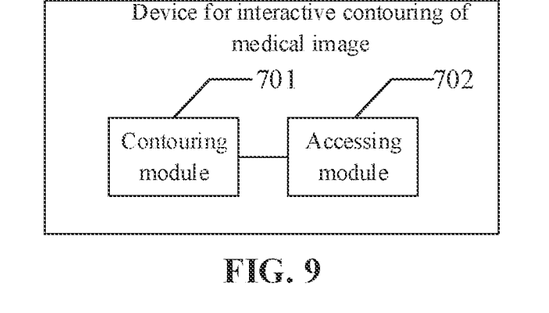
FIG. 9 is a schematic structural diagram of a device for interactive contouring of a medical image according to an embodiment of the present disclosure.

In order to better perform the method for interactive contouring of a medical image according to an embodiment of the present disclosure, embodiments of the present disclosure further provide a device for interactive contouring of a medical image based on the method for interactive contouring of a medical image. FIG. 9 is a schematic structural diagram of a device for interactive contouring of a medical image according to an embodiment of the present disclosure. As shown in FIG. 9, the device includes:

a contouring module 701, configured to run a contour service process to receive patient information to be contoured, perform contouring on the patient information to be contoured, and save a contouring result; and an accessing module 702, configured to run an access service process to acquire, in response to an access request for a contouring result of a first target patient, the contouring result of the first target patient from the saved contouring result, and send the acquired contouring result of the first target patient to a user terminal.

In some embodiments of the present disclosure, the device includes:

a predetermined database, configured to store a contouring result and a contouring list, the contouring list including a patient information list corresponding to a medical image to be contoured, a patient information list corresponding to a medical image being contoured and a patient information list corresponding to a contoured medical image.

In some embodiments of the present disclosure, the predetermined database in the device includes a first database and a second database. The first database is configured to store the patient information list corresponding to the medical image to be contoured and the patient information list corresponding to the medical image being contoured, and the second database is configured to store the patient information list corresponding to the contoured medical image.

In some embodiments of the present disclosure, the first database is a Redis database and/or a second database is a MySQL database.

In some embodiments of the present disclosure, the device further includes:

a static resource service module configured to receive the access request for the contouring result of the first target patient, acquire address information of the first target patient associated with the access request, acquire the contouring result of the first target patient saved in the address information, and send the contouring result of the first target patient to the accessing module.

A contour service process and an access service process are provided in the structure of the device to process a contouring request and an access and query request respectively, and share data and work cooperatively, such that the interference between tasks corresponding to different services may be avoided, two functions for processing the contouring request and processing the access and query request do not affect each other and are decoupled from each other, thereby reducing the hardware pressure of the device.

It is to be noted that the above modules may be one or more integrated circuits configured to perform the above method, for example, one or more application specific integrated circuits (ASIC), or one or more microprocessors (i.e., digital signal processors, DSP), or one or more field programmable gate arrays (FPGA), or the like. For another example, when any of the above modules is implemented in the form of a processing element scheduling program code, the processing element may be a general-purpose processor, for example, a central processing unit (CPU) or other processors that may call the program code. For still another example, these modules may be integrated together and implemented in the form of a system-on-chip (SOC).

Figure 10:
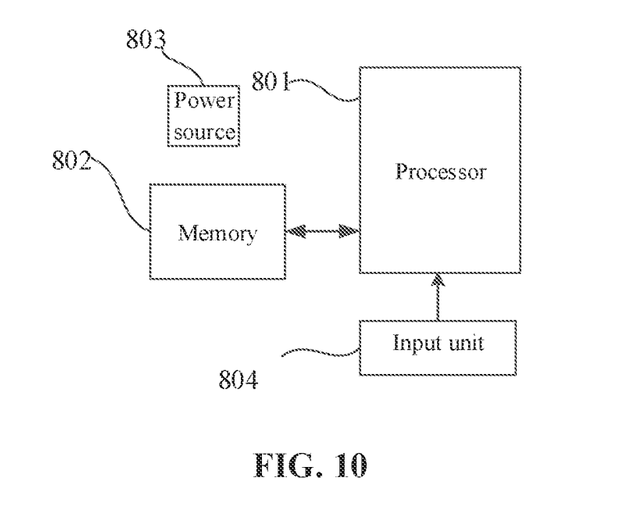
FIG. 10 is a schematic structural diagram of a device for interactive contouring of a medical image according to an embodiment of the present disclosure.

An embodiment of the present disclosure further provides a device for interactive contouring of a medical image. FIG. 10 is a schematic structural diagram of a device for interactive contouring of a medical image. As illustrated in FIG. 10, the device includes:

one or more processors;
a memory; and
one or more applications stored in the memory;
wherein the one or more processors, when loading and running the one or more applications, are caused to perform the method for interactive contouring of a medical image as described in any one of the method embodiments.

Specifically, the device may include a processor 801 having one or more processing cores, a memory 802 including one or more computer-readable storage media, a power source 803, an input unit 804, and the like. It can be understood by those skilled in the art that the structure illustrated in FIG. 10 does not constitute a limitation to the device and may include more or fewer components than those as illustrated, a combination of certain components, or have components arranged in a different fashion.

The processor 801 is a control center of the device for interactive contouring of a medical image, links all portions of the entire device by various interfaces and lines, and by running or executing a software program and/or a module stored in the memory 802 and calling data stored in the memory 802, performs various functions of the device and processes data, so as to wholly monitor the device. Optionally, the processor 801 may include one or more processing cores. Preferably, the processor 801 may be integrated with an application processor and a modulation and demodulation processor. The application processor is mainly configured to process an operating system, a user interface, an application, etc. The modulation and demodulation processor is mainly configured to process radio communication. Understandably, the modulation and demodulation processor may not be integrated with the processor 801.

The memory 802 may be configured to store a software program and a module. The processor 802 executes various function applications and data processing by running the software program and the module, which are stored in the memory 802. The memory 802 may mainly include a program storage area and a data storage area. The program storage area may store an operating system and an application required by at least one function (such as an audio playback function and a training playback function). The data storage area may store data built based on the use of the device for interactive contouring of a medical image. Moreover, the memory 802 may include a high-speed random-access memory and may further include a non-volatile memory, such as at least one disk memory, a flash memory or other volatile solid-state memories. Correspondingly, the memory 802 may further include a memory controller to provide access to the memory 802 by the processor 801.

The device may further include the power source 803 configured to supply power to all the components. Preferably, the power source 803 may be logically connected to the processor 801 by a power management system so as to manage charging, discharging, power consumption, etc. by the power management system. The power source 803 may further include one or more of any of the following components: a direct current (DC) or alternating current (AC) power source, a recharging system, a power failure detection circuit, a power converter or inverter and a power state indicator.

The device further includes the input unit 804. The input unit 804 may be configured to receive input digital or character information and generate keyboard, mouse, manipulator, optical or trackball signal inputs related to user settings and functional control.

Although not shown, the device may further include a display unit, which is not repeated herein. Specifically, in the embodiment, the processor 801 in the device may load an executable file corresponding to the process of one or more applications into the memory 802 according to the following instructions, and the processor 801 runs the applications stored in the memory 802 to achieve various functions.

In an embodiment, the processor 801, when loading and running the one or more applications described above, is caused to perform:

running a contour service process to receive patient information to be contoured, perform contouring based on the patient information to be contoured, and save a contouring result; and running an access service process to acquire, in response to an access request for a contouring result of a first target patient, the contouring result of the first target patient from the saved contouring result, and send the acquired contouring result of the first target patient to a user terminal.

Those of ordinary skill in the art may understand that all or part of the steps in all the methods of the above embodiments may be completed through the instructions, or through relevant hardware controlled by the instructions, and the instructions may be stored in a computer medium and loaded and executed by the processor.

Therefore, an embodiment of the present disclosure provides a non-transitory computer-readable storage medium, which may include a read-only memory (ROM), a random-access memory (RAM), a disk or an optical disk. One or more computer programs are stored on the non-transitory computer-readable storage medium. The one or more computer programs, when loaded and run a processor, cause the processor to perform the steps in any one of the methods for interactive contouring of a medical image according to the embodiments of the present disclosure.

In an embodiment, the one or more computer programs, when loaded and run the processor, cause the processor to perform:

running a contour service process to receive patient information to be contoured, perform contouring based on the patient information to be contoured, and save a contouring result; and running an access service process to acquire, in response to an access request for a contouring result of a first target patient, the contouring result of the first target patient from the saved contouring result, and send the acquired contouring result of the first target patient to a user terminal.

In the above embodiments, the descriptions of each embodiment have their own emphasis. For the portions that are not described in detail in a certain embodiment, a reference may be made to the above detailed descriptions of other embodiments, which will not be repeated herein.

During specific implementation, the above units or structures may be implemented as independent entities, or may be arbitrarily combined to be implemented as the same or several entities. For the specific implementation of the above units or structures, a reference may be made to the foregoing method embodiments, which will not be repeated herein.

A reference may be made to the foregoing embodiments for the specific implementation of each of the above operations, which will not be repeated herein.

The method for interactive contouring of a medical image according to the embodiment of the present disclosure is described above in detail. The principles and implementation of the present disclosure are described with specific examples in the text. The descriptions of the above embodiments are merely used to help understand the method of the present disclosure and its core idea. Meanwhile, for those skilled in the art, there will be changes in the specific implementation and application scope according to the idea of the present disclosure. In summary, the content of the description shall not be construed as a limitation to the present disclosure.

What is claimed is:

1. A method for interactive contouring of a medical image, comprising:
    running a contour service process to receive patient information to be contoured, perform contouring based on the patient information to be contoured, and save a contouring result;
    running an access service process to acquire, in response to an access request for a contouring result of a first target patient, the contouring result of the first target patient from the saved contouring result, and send the acquired contouring result of the first target patient to a user terminal; and running the contour service process to update a contouring list in a predetermined database based on a contouring progress, the contouring list comprising a patient information list corresponding to a medical image to be contoured, a patient information list corresponding to a medical image being contoured, and a patient information list corresponding to a contoured medical image; and running the access service process to query, in response to a query request for a contouring progress of a second target patient, the contouring list in the predetermined database to determine the contouring progress of the second target patient, and send the contouring progress corresponding to the second target patient to the user terminal.

2. The method according to claim 1, wherein the predetermined database comprises a first database and a second database; wherein the first database is configured to store the patient information list corresponding to the medical image to be contoured, and the patient information list corresponding to the medical image being contoured; and the second database is configured to store the patient information list corresponding to the contoured medical image.

3. The method according to claim 2, wherein the first database is a Redis database and/or the second database is a MySQL database.

4. The method according to claim 2, wherein the contour service process comprises a first contour service thread and a second contour service thread; wherein the first contour service thread is configured to sequentially receive the patient information to be contoured, and sequentially save the patient information to be contoured in the patient information list corresponding to the medical image to be contoured; and the second contour service thread is configured to sequentially read the patient information to be contoured from the patient information list corresponding to the medical image to be contoured, write the read patient information into the patient information list corresponding to the medical image being contoured, and delete the read patient information from the patient information list corresponding to the medical image to be contoured; and the second contour service thread is further configured to sequentially contour a medical image corresponding to patient information in the patient information list corresponding to the medical image being contoured, write the contoured patient information into the patient information list corresponding to the contoured medical image upon finishing contouring, and delete the contoured patient information from the patient information list corresponding to the medical image being contoured.

5. The method according to claim 1, further comprising:

running the access service process to lock, in response to a contouring order adjustment request, the patient information to be contoured, and unlock, upon completion of contouring order adjustment, the patient information to be contoured; and running the contour service process to acquire a state of the patient information to be contoured, terminate contouring until the patient information to be contoured is unlocked in the case that the patient information to be contoured is in a locked state, and perform contouring based on the patient information to be contoured.

6. The method according to claim 1, further comprising:

running the access service process to read, in response to a contouring order adjustment request from a browsing page of the user terminal, patient information in the patient information list corresponding to the medical image to be contoured, adjust, based on the contouring order adjustment request, an ordering of the patient information in the patient information list corresponding to the medical image to be contoured in the case that it is determined that the ordering of the patient information in the list is the same as an ordering of patient information displayed on the browsing page, or otherwise, refresh the patient information displayed on the browsing page.

7. The method according to claim 1, further comprising:

creating the contour service process and the access service process, and establishing the predetermined database; and setting a communication protocol, and calling, when receiving an operation request, the contour service process and/or the access service process based on the communication protocol to access the predetermined database.

8. The method according to claim 1, further comprising:

running the contour service process to receive the patient information to be contoured, input a medical image corresponding to the patient information into a predetermined image generation model, contour the medical image by the predetermined image generation model to acquire a medical image contour, and save the medical image contour.

9. A device for interactive contouring of a medical image, comprising:

one or more processors;
a memory; and
one or more applications stored in the memory;
wherein the one or more processors, when loading and running the one or more applications, are caused to perform:

running a contour service process to receive patient information to be contoured, perform contouring based on the patient information to be contoured, and save a contouring result;

running an access service process to acquire, in response to an access request for a contouring result of a first target patient, the contouring result of the first target patient from the saved contouring result, and send the acquired contouring result of the first target patient to a user terminal; and running the contour service process to update a contouring list in a predetermined database based on a contouring progress, the contouring list comprising a patient information list corresponding to a medical image to be contoured, a patient information list corresponding to a medical image being contoured, and a patient information list corresponding to a contoured medical image; and running the access service process to query, in response to a query request for a contouring progress of a second target patient, the contouring list in the predetermined database to determine the contouring progress of the second target patient, and send the contouring progress corresponding to the second target patient to the user terminal.

10. The device according to claim 9, wherein the predetermined database comprises a first database and a second database; wherein
the first database is configured to store the patient information list corresponding to the medical image to be contoured, and the patient information list corresponding to the medical image being contoured; and
the second database is configured to store the patient information list corresponding to the contoured medical image.

11. The device according to claim 10, wherein the first database is a Redis database and/or the second database is a MySQL database.

12. The device according to claim 10, wherein the contour service process comprises a first contour service thread and a second contour service thread; wherein
the first contour service thread is configured to sequentially receive the patient information to be contoured, and sequentially save the patient information to be contoured in the patient information list corresponding to the medical image to be contoured; and
the second contour service thread is configured to sequentially read the patient information to be contoured from the patient information list corresponding to the medical image to be contoured, write the read patient information into the patient information list corresponding to the medical image being contoured, and delete the read patient information from the patient information list corresponding to the medical image to be contoured; and the second contour service thread is further configured to sequentially contour a medical image corresponding to patient information in the patient information list corresponding to the medical image being contoured, write the contoured patient information into the patient information list corresponding to the contoured medical image upon finishing contouring, and delete the contoured patient information from the patient information list corresponding to the medical image being contoured.

13. The device according to claim 9, wherein the one or more processors, when loading and running the one or more applications, are caused to perform:
running the access service process to lock, in response to a contouring order adjustment request, the patient information to be contoured, and unlock, upon completion of contouring order adjustment, the patient information to be contoured; and
running the contour service process to acquire a state of the patient information to be contoured, terminate contouring until the patient information to be contoured is unlocked in the case that the patient information to be contoured is in a locked state, and perform contouring based on the patient information to be contoured.

14. The device according to claim 9, wherein the one or more processors, when loading and running the one or more applications, are caused to perform:
running the access service process to read, in response to a contouring order adjustment request from a browsing page of the user terminal, patient information in the patient information list corresponding to the medical image to be contoured, adjust, based on the contouring order adjustment request, an ordering of the patient information in the patient information list corresponding to the medical image to be contoured in the case that it is determined that the ordering of the patient information in the list is the same as an ordering of patient information displayed on the browsing page, or otherwise, refresh the patient information displayed on the browsing page.

15. The device according to claim 9, wherein the one or more processors, when loading and running the one or more applications, are caused to perform:
creating the contour service process and the access service process, and establishing the predetermined database; and
setting a communication protocol, and calling, when receiving an operation request, the contour service process and/or the access service process based on the communication protocol to access the predetermined database.

16. The device according to claim 9, wherein the one or more processors, when loading and running the one or more applications, are caused to perform:
running the contour service process to receive the patient information to be contoured, input a medical image corresponding to the patient information into a predetermined image generation model, contour the medical image by the predetermined image generation model to acquire a medical image contour, and save the medical image contour.

17. A system for interactive contouring of a medical image, comprising the device for interactive contouring of a medical image as defined in claim 9 and a user terminal;
wherein the user terminal is configured to: send an access request for a contouring result of a first target patient to the device for interactive contouring of the medical image; and receive the contouring result of the first target patient from the device for interactive contouring of the medical image; and
the user terminal is further configured to: send a query request for a contouring progress of a second target patient to the device for interactive contouring of the medical image; and receive the contouring progress corresponding to the second target patient from the device for interactive contouring of the medical image.

18. A non-transitory computer-readable storage medium storing one or more computer programs, wherein the one or more computer programs, when loaded and run by a processor of a device, cause the device to perform a method for interactive contouring of a medical image, and the method comprises:
running a contour service process to receive patient information to be contoured, perform contouring based on the patient information to be contoured, and save a contouring result;
running an access service process to acquire, in response to an access request for a contouring result of a first target patient, the contouring result of the first target patient from the saved contouring result, and send the acquired contouring result of the first target patient to a user terminal; and
running the contour service process to update a contouring list in a predetermined database based on a contouring progress, the contouring list comprising a patient information list corresponding to a medical image to be contoured, a patient information list corresponding to a medical image being contoured, and a patient information list corresponding to a contoured medical image; and
running the access service process to query, in response to a query request for a contouring progress of a second target patient, the contouring list in the predetermined database to determine the contouring progress of the second target patient, and send the contouring progress corresponding to the second target patient to the user terminal.

\* \* \* \* \*